(12) United States Patent
Blank

(10) Patent No.: US 9,958,222 B2
(45) Date of Patent: May 1, 2018

(54) BREECH BOLT FOR FIREARM

(75) Inventor: Michael H. Blank, Chesterfield, MO (US)

(73) Assignee: Michael H. Blank, Chesterfield, MO (US)

( * ) Notice: Subject to any disclaimer, the term of this patent is extended or adjusted under 35 U.S.C. 154(b) by 449 days.

(21) Appl. No.: 13/564,422

(22) Filed: Aug. 1, 2012

(65) Prior Publication Data

US 2014/0075806 A1     Mar. 20, 2014

(51) Int. Cl.
| | | |
|---|---|---|
| F41A 3/14 | (2006.01) | |
| F41A 3/26 | (2006.01) | |
| F41A 3/30 | (2006.01) | |
| B23P 6/00 | (2006.01) | |
| F41A 15/14 | (2006.01) | |

(52) U.S. Cl.
CPC ........ *F41A 3/14* (2013.01); *B23P 6/00* (2013.01); *F41A 3/26* (2013.01); *F41A 3/30* (2013.01); *F41A 15/14* (2013.01); *Y10T 29/4973* (2015.01); *Y10T 29/49723* (2015.01); *Y10T 29/49725* (2015.01)

(58) Field of Classification Search
CPC ....... F41A 3/12–3/16; F41A 3/26–3/30; F41A 15/14
USPC .......... 42/14–16, 25, 69.02; 89/180, 184–185
See application file for complete search history.

(56) References Cited

U.S. PATENT DOCUMENTS

| | | | | |
|---|---|---|---|---|
| 2,031,383 A | * | 2/1936 | Mendoza | ...................... 42/75.01 |
| 2,330,737 A | * | 9/1943 | Pedersen | ........................... 42/50 |
| 2,567,198 A | * | 9/1951 | Garand | ............................ 89/188 |
| 2,655,837 A | * | 10/1953 | Johnson | .................... F41A 9/29 42/25 |
| 2,941,449 A | * | 6/1960 | Reed | ............................... 89/185 |
| 2,951,424 A | | 9/1960 | Stoner | |
| 3,035,495 A | | 5/1962 | Stoner | |
| 3,198,076 A | | 8/1965 | Stoner | |
| 3,507,187 A | * | 4/1970 | Maillard | ......................... 89/185 |
| 4,655,118 A | | 4/1987 | Bruderer et al. | |
| 4,765,224 A | | 8/1988 | Morris | |
| 5,351,598 A | * | 10/1994 | Schuetz | .................... F41A 5/18 42/25 |

(Continued)

FOREIGN PATENT DOCUMENTS

WO     2012098283 A1     7/2012

OTHER PUBLICATIONS

European Search Report of corresponding application Serial No. EP13178657 dated Mar. 23, 2015.

*Primary Examiner* — Stephen Johnson
*Assistant Examiner* — Benjamin S Gomberg
(74) *Attorney, Agent, or Firm* — Sandberg Phoenix & von Gontard P. C.

(57) ABSTRACT

A firearm including a receiver, a barrel, a breech bolt assembly, and a trigger assembly. The bolt assembly has a bolt including a body portion, a lug portion, and a firing pin bore. The lug portion includes outward extending lugs, a cartridge recess, and an off-center hole. The bolt assembly also includes an extractor and an ejector pin. At least some of the lugs on the lug portion of the bolt have a tapering outer face so that a rearward face of the respective lug is taller than a forward face of the respective lug. In another aspect, at least some of the lugs on the lug portion of the bolt have tapering side faces so that a rearward face of the respective lug is wider than a forward face of the respective lug.

10 Claims, 4 Drawing Sheets

(56) References Cited

U.S. PATENT DOCUMENTS

| | | | |
|---|---|---|---|
| 5,499,569 A * | 3/1996 | Schuetz | 89/197 |
| 5,911,173 A | 6/1999 | Westrom | |
| 6,044,580 A | 4/2000 | Gussalli Beretta | |
| 6,182,389 B1 * | 2/2001 | Lewis | 42/16 |
| 6,508,025 B1 * | 1/2003 | Du Plessis | 42/16 |
| 6,536,150 B2 * | 3/2003 | Schweikart | F41A 3/26 42/16 |
| 6,609,319 B1 * | 8/2003 | Olson | 42/16 |
| 6,622,606 B1 | 9/2003 | Neal | |
| 6,634,274 B1 | 10/2003 | Herring | |
| 6,681,677 B2 | 1/2004 | Herring | |
| 6,722,255 B2 | 4/2004 | Herring | |
| 6,978,709 B2 * | 12/2005 | Aalto | F41A 3/30 89/185 |
| 7,040,213 B2 | 5/2006 | Herring | |
| 7,331,135 B2 * | 2/2008 | Shimi | F41A 3/66 42/16 |
| 7,428,795 B2 | 9/2008 | Herring | |
| 9,032,860 B2 * | 5/2015 | Faxon | F41A 15/14 89/193 |
| 9,234,713 B1 * | 1/2016 | Olson | F41A 15/14 |
| 2014/0075807 A1 * | 3/2014 | Lewis | F41A 3/12 42/25 |

* cited by examiner

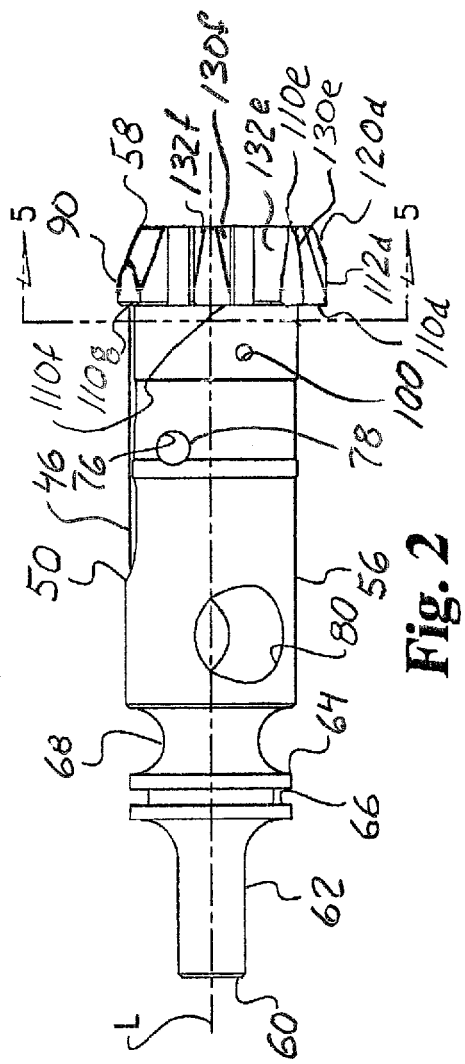
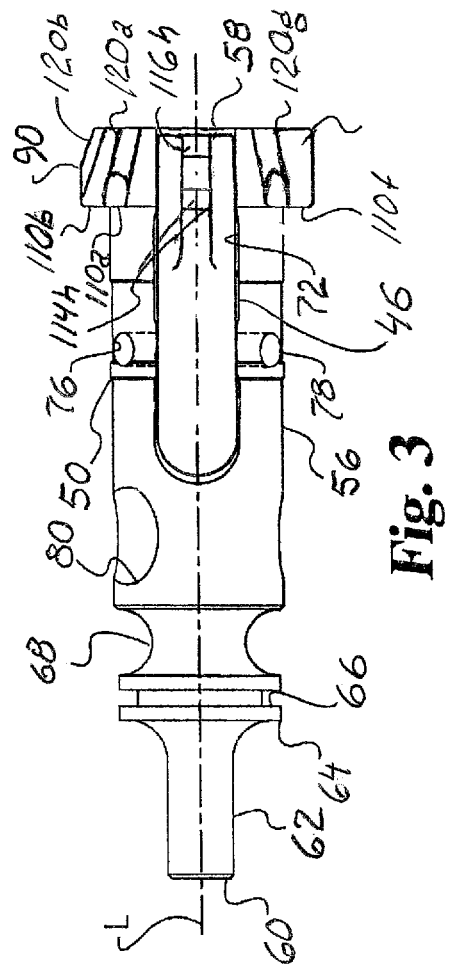

BREECH BOLT FOR FIREARM

BACKGROUND

The present invention relates to firearm breech bolt assemblies, and more particularly, but not exclusively, to a breech bolt having improved reliability.

Automatic rifles have been standard weapons of choice for the armed forces and police SWAT units. These weapons also have semi-automatic counterparts which are popular with civilians. Many of these automatic and semi-automatic firearms are based on a gas-operated breech bolt carrier system. U.S. Pat. Nos. 2,951,424 and 3,198,076 both to Stoner provide early examples of these types of weapons. Generally, the bolt carrier system of these weapons includes a multi-lug breech bolt that interlocks with lugs on a bolt receiver for firing each round of ammunition. The pressurized gases resulting from the weapon firing a bullet are directed to slide the breech bolt backward and then forward in the receiver, ejecting a spent shell casing and loading a new cartridge from a magazine adjacent the receiver.

Occasionally, the breech bolt becomes misaligned with the receiver when in the bolt is moving forward so the lugs on the breech bolt are no longer aligned with gaps between the lugs on the receiver. When the lugs and gaps slots are out of alignment, the bolt cannot slide forward to chamber the new cartridge and the bolt becomes jammed. Jammed bolts limit the overall reliability of the weapon. By reducing the frequency of jammed bolts, maintenance-actions for the gun are correspondingly reduced and overall reliability is improved. Consequently, there is a need to better ensure the bolt lugs properly mesh with the receiver gaps.

SUMMARY

In one aspect, the present invention includes a firearm for firing a projectile from a cartridge including a shell casing having a hollow interior, propellant in the interior of the shell casing, and the projectile mounted at a forward end of the shell casing. The firearm comprises a receiver having a cavity therein and a barrel interface at a forward end thereof. The barrel interface includes a bolt interlocking chamber and a plurality of receiver lugs spaced by gaps and extending inward behind the bolt interlocking chamber. The firearm has an elongate barrel mounted on the barrel interface for directing the projectile forward when fired from the cartridge. The barrel includes a firing chamber at a rearward end for holding the cartridge prior to firing the projectile and for holding the shell casing after the projectile is fired. The firing chamber is positioned in front of the bolt interlocking chamber. Further, the firearm includes a breech bolt assembly mounted in the receiver cavity behind the barrel interface for loading the cartridge in the firing chamber from a cartridge source prior to firing, and extracting the shell casing from the firing chamber after firing. The bolt assembly comprises a bolt including an elongate cylindrical body portion having a longitudinal centerline, a lug portion extending forward from the body portion, and a firing pin bore extending through the bolt parallel to the longitudinal centerline. The lug portion includes a plurality of lugs extending outward therefrom, a cartridge recess at a front end sized and shaped for holding a rearward end of the cartridge therein, and an off-center longitudinal hole at least partially aligned with the cartridge recess. The plurality of lugs is spaced to correspond to the gaps between the receiver lugs so that the plurality of bolt lugs can slide forward through the gaps and rotate about the centerline of the body portion to align at least some of the plurality of bolt lugs with at least some of the plurality of receiver lugs. The bolt assembly also includes an extractor pivotally mounted in the extractor cavity and biased to hold the cartridge in the cartridge recess, and an ejector pin slidably received in the off-center longitudinal hole. The pin is biased to eject the shell casing from the cartridge recess. The firearm also has a trigger assembly including a firing pin slidably received in the firing pin bore of the bolt and aligned with the cartridge when received in the cartridge recess and firing chamber for initiating firing of the projectile from the cartridge. At least some of the plurality of lugs on the lug portion of the bolt have a tapering outer face so that a rearward face of the respective lug is taller than a forward face of the respective lug.

In another aspect, the present invention includes a breech bolt assembly for mounting in a firearm for loading a cartridge in a firing chamber of the firearm prior to firing a projectile from the cartridge and extracting a shell casing from the firing chamber after firing. The bolt assembly comprises a bolt including an elongate cylindrical body portion having a longitudinal centerline, a lug portion extending forward from the body portion, and a firing pin bore extending through the bolt parallel to the longitudinal centerline. The lug portion includes a plurality of spaced lugs extending outward therefrom, a cartridge recess at a front end sized and shaped for holding a rearward end of the cartridge therein, and an off-center longitudinal hole at least partially aligned with the cartridge recess. The bolt assembly also includes an extractor pivotally mounted in the extractor cavity and biased to hold the cartridge in the cartridge recess, and an ejector pin slidably received in the off-center longitudinal hole. The pin is biased to eject the shell casing from the cartridge recess. At least some of the plurality of lugs on the lug portion of the bolt have a tapering outer face so that a rearward face of the respective lug is taller than a forward face of the respective lug.

In still another aspect, the present invention includes a method for increasing reliability of a firearm, comprising removing a used breech bolt from the firearm, and installing a new breech bolt in the firearm. The new bolt has a plurality of lugs have a tapering outer face so that a rearward face of each respective lug is taller than a forward face of the respective lug.

In yet another aspect, the present invention includes a method for increasing reliability of a firearm, comprising removing a breech bolt having a plurality of lugs from the firearm, and reworking the breech bolt so at least some of the lugs have a tapering outer face. The outer face tapers so that a rearward face of each respective lug is taller than a forward face of the respective lug. The method also includes installing the reworked breech bolt in the firearm.

In another aspect, the present invention includes a firearm for firing a projectile from a cartridge including a shell casing having a hollow interior, propellant in the interior of the shell casing, and the projectile mounted at a forward end of the shell casing. The firearm comprises a receiver having a cavity therein and a barrel interface at a forward end thereof. The barrel interface includes a bolt interlocking chamber and a plurality of receiver lugs spaced by gaps and extending inward behind the bolt interlocking chamber. The firearm has an elongate barrel mounted on the barrel interface for directing the projectile forward when fired from the cartridge. The barrel includes a firing chamber at a rearward end for holding the cartridge prior to firing the projectile and for holding the shell casing after the projectile is fired. The firing chamber is positioned in front of the bolt interlocking chamber. Further, the firearm includes a breech bolt assembly mounted in the receiver cavity behind the barrel interface for loading the cartridge in the firing chamber from a cartridge source prior to firing, and extracting the shell casing from the firing chamber after firing. The bolt assembly comprises a bolt including an elongate cylindrical body portion having a longitudinal centerline, a lug portion extending forward from the body portion, and a firing pin bore extending through the bolt parallel to the longitudinal centerline. The lug portion includes a plurality of lugs extending outward therefrom, a cartridge recess at a front end sized and shaped for holding a rearward end of the cartridge therein, and an off-center longitudinal hole at least partially aligned with the cartridge recess. The plurality of lugs is spaced to correspond to the gaps between the receiver lugs so that the plurality of bolt lugs can slide forward through the gaps and rotate about the centerline of the body portion to align at least some of the plurality of bolt lugs with at least some of the plurality of receiver lugs. The bolt assembly also includes an extractor pivotally mounted in the extractor cavity and biased to hold the cartridge in the cartridge recess, and an ejector pin slidably received in the off-center longitudinal hole. The pin is biased to eject the shell casing from the cartridge recess. The firearm also has a trigger assembly including a firing pin slidably received in the firing pin bore of the bolt and aligned with the cartridge when received in the cartridge recess and firing chamber for initiating firing of the projectile from the cartridge. At least some of the plurality of lugs on the lug portion of the bolt have tapering side faces so that a rearward face of the respective lug is wider than a forward face of the respective lug.

In another aspect, the present invention includes a breech bolt assembly for mounting in a firearm for loading a cartridge in a firing chamber of the firearm prior to firing a projectile from the cartridge and extracting a shell casing from the firing chamber after firing. The bolt assembly comprises a bolt including an elongate cylindrical body portion having a longitudinal centerline, a lug portion extending forward from the body portion, and a firing pin bore extending through the bolt parallel to the longitudinal centerline. The lug portion includes a plurality of spaced lugs extending outward therefrom, a cartridge recess at a front end sized and shaped for holding a rearward end of the cartridge therein, and an off-center longitudinal hole at least partially aligned with the cartridge recess. The bolt assembly also includes an extractor pivotally mounted in the extractor cavity and biased to hold the cartridge in the cartridge recess, and an ejector pin slidably received in the off-center longitudinal hole. The pin is biased to eject the shell casing from the cartridge recess. At least some of the plurality of lugs on the lug portion of the bolt have tapering side faces so that a rearward face of the respective lug is wider than a forward face of the respective lug.

In yet another aspect, the present invention includes a method for increasing reliability of a firearm. The method comprises removing a used breech bolt from the firearm, and installing a new breech bolt in the firearm. The new bolt includes a lug on the lug portion of the bolt have tapering side faces so that a rearward face of the respective lug is wider than a forward face of the respective lug.

And, in a still another aspect, the present invention includes a method for increasing reliability of a firearm. The method comprises removing a breech bolt having a plurality of lugs from the firearm, and reworking the breech bolt so a lug on the lug portion of the bolt has tapering side faces so that a rearward face of the respective lug is wider than a forward face of the lug. The method includes installing the reworked breech bolt in the firearm.

Other aspects of the present invention will be apparent in view of the following description and claims.

BRIEF DESCRIPTION OF THE DRAWINGS

FIG. 2 is a side elevation of a breech bolt of the weapon depicted in FIG. 1;

FIG. 3 is a top plan of the breech bolt depicted in FIG. 2;

Corresponding reference characters indicate corresponding parts throughout the drawings.

DETAILED DESCRIPTION OF THE DRAWINGS

Figure 1:
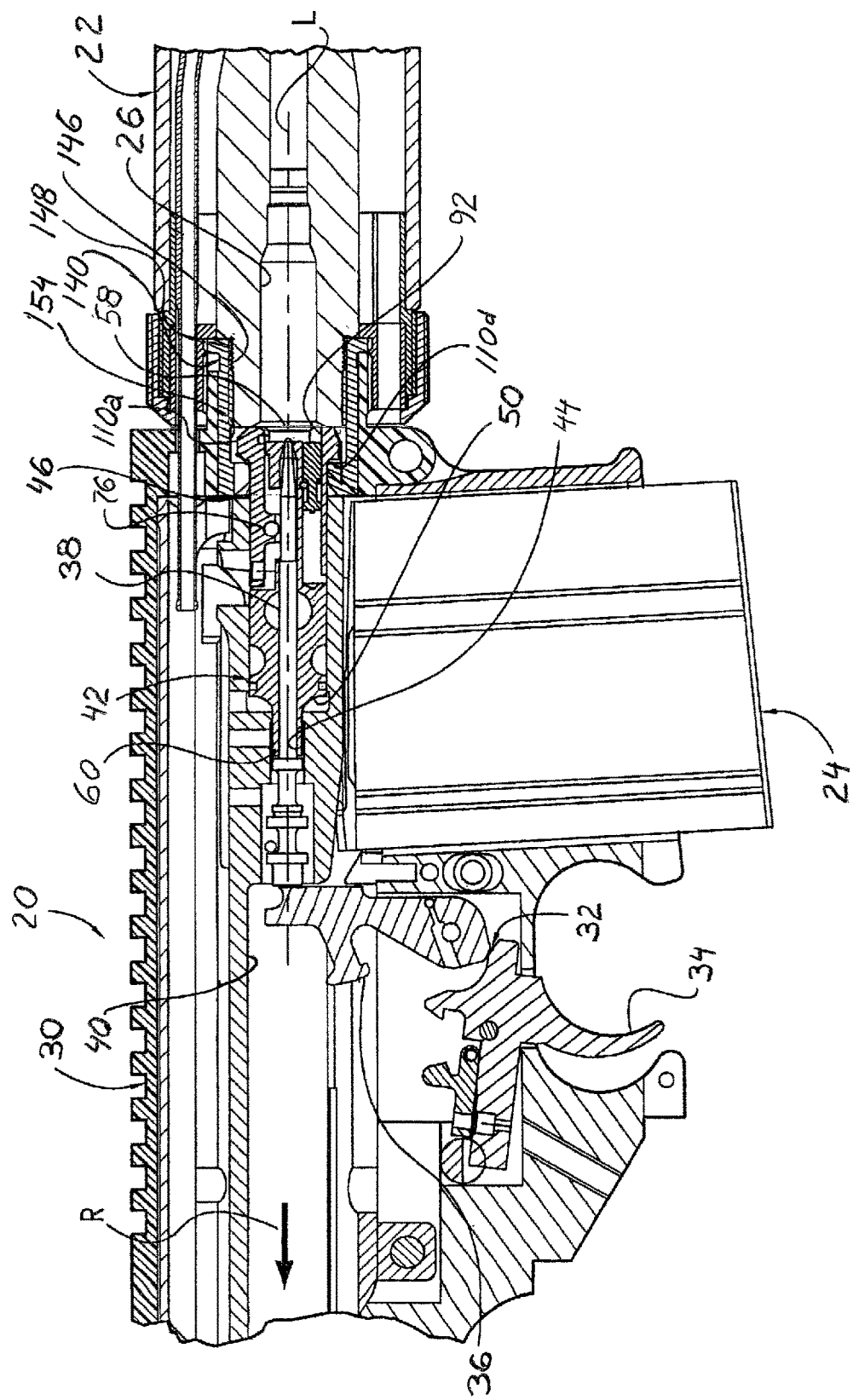
FIG. 1 is a fragmentary cross section of a firearm of one embodiment of the present invention.

Referring to FIG. 1, a firearm incorporating one embodiment of the present invention is designated in its entirety by the reference number 20. The firearm 20 has a barrel 22 and a cartridge source such as a magazine 24. The magazine 24 is configured to sequentially feed cartridges to a firing chamber 26 through a receiver 30. The receiver 30 includes a trigger assembly 32 with a spring-loaded trigger 34, a spring-loaded hammer 36, and a firing pin 38. The receiver 30 has a cavity 40 configured to house a breech bolt assembly 42. The breech bolt assembly 42 has a firing pin bore 44 through which the firing pin 38 extends. The breech bolt assembly 42 also includes a spring-loaded extractor 46 and a breech bolt 50. The extractor 46 has a guide flange 52 and is pivotably coupled by a pivot pin 54 to the breech bolt 50.

As illustrated in FIGS. 2 and 3, the breech bolt 50 has a cylindrical body portion 56, as well as opposite front and back ends 58, 60, respectively, spaced along a longitudinal centerline L. A stem 62 extends longitudinally from the back end of the body portion 56. The stem 62 includes a circular sealing flange 64 having a circumferential groove 44 configured for receiving conventional sealing rings (not shown). A neck 68 separates the sealing flange 64 from the cylindrical body portion 56. The body portion 56 has a longitudinal extractor cavity 72 for receiving an extractor 46 and a lateral hole 76 intersecting the extractor cavity for receiving an extractor pivot pin 78 to hold the extractor in position in the cavity. A larger lateral hole 80 extends across the breech bolt body portion 56 behind the extractor 46 for receiving a conventional cam pin (not shown) to rotate the bolt 50 between an unlocked and locked position as is understood by those skilled in the art.

Figure 4:
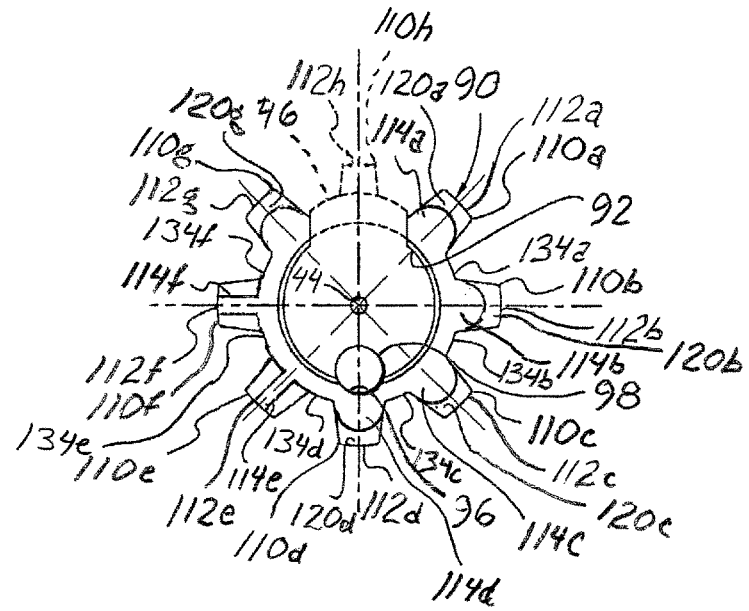
FIG. 4 is a front elevation of the breech bolt depicted in FIG. 2.

As shown in FIGS. 2-4, the breech bolt 50 also has lug portion 90 at the front end of the cylindrical body portion 56. The lug portion 90 includes a cartridge recess 92 to receive a rearward end of a chambered cartridge C. The extractor 46 is biased radially inward by a coil spring (not shown) for holding the chambered cartridge C in the cartridge recess 92. As illustrated in FIG. 4, the lug portion 90 also has an off-center, longitudinal hole 96 that extends well into the cylindrical body portion 56. The hole 96 receives an ejector pin 98 for ejecting a spent shell casing as is well known in the art. As shown in FIG. 2, the body portion 56 includes a lateral hole 100 that intersects the hole 96 for receiving a split pin (not shown) to slidably capture the ejector pin 98 in the hole. A coil spring (not shown) is positioned between the ejector pin 98 and a bottom of the hole 96 to bias the ejector pin in the forward direction. The body portion 56 includes a radial hole (not shown) that intersects the hole 96 for confirming the coil spring is in position between the pin 98 and the bottom of the hole.

The lug portion 90 has a plurality of bolt lugs 110a-g, extending radially about longitudinal axis L. An eighth lug 110h extends radially from the extractor 46. Although this eighth lug 110h does not function hold the bolt 50 in position against recoil forces during cartridge firing like the other lugs 110a-g, it projects from the extractor 46 and is intended to be included within the meaning of the term lug has used herein. The lugs 110a-h are evenly spaced about the bolt 50 at about 45° intervals. Lugs 110a-g have flat outer lands 112a-g spaced a common distance from the longitudinal axis L, but lug 110h has a flat outer land 112h spaced a shorter distance from the longitudinal axis (regardless of whether the extractor 46 is holding a cartridge). Lugs 110a-g have flat radially extending forward and rearward faces 114a-g (FIG. 4), 116a-g (FIG. 5), respectively, positioned at common positions along the longitudinal axis L. As shown in FIG. 3, lug 110h, however, has radially skewed forward and rearward faces 114h, 116h, respectively. As will be appreciated by those skilled in the art, the rearward faces 116a-g of lugs 110a-g are load-bearing surfaces during cartridge firing.

As further illustrated in FIG. 4, unlike conventional bolts, each of the lugs 110a-d&g of the bolt 50 of the illustrated embodiment has a rounded tapering outer face 120a-d and 120g extending from its respective outer land 112a-d and 112g to its respective forward face 114a-d and 114g. Although the tapering outer faces 120a-d and 120g may have other dimensional characteristics without departing from the scope of the present invention, in one embodiment the faces are tapered at an angle in a range of about 5° to about 40° measured from longitudinal, more particularly at an angle in a range of about 10° to about 32° measured from longitudinal, and still more particularly at an angle of about 21°. Although the forward faces 114a-d and 114g may have other dimensional characteristics without departing from the scope of the present invention, in one embodiment the faces are shorter than the forward faces 114e and 114f by a radial distance in a range of about 0.010 in. to about 0.060 in., more particularly by a radial distance in a range of about 0.025 in. to about 0.045 in., and still more particularly by a radial distance of about 0.035 in.

Figure 5:
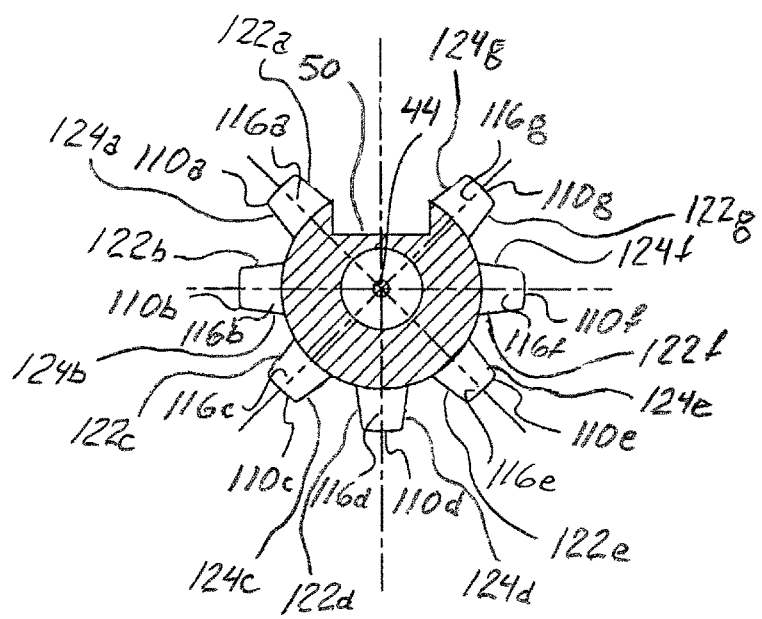
FIG. 5 is a cross section of the breech bolt taken along line 5-5 of FIG. 2.

Further, as illustrated in FIG. 5, each of the lugs 110a-h have circumferential side faces 122a-h and 124a-h, extending longitudinally along the bolt 50. Although each of the side face pairs (i.e., 122a, 124a; 122b, 124b; etc.) may taper toward each other, forming varying lug thicknesses as illustrated, those skilled in the art will appreciate that the side face pairs may be parallel without departing from the scope of the present invention. As shown in FIG. 2, unlike conventional bolts, both of the lugs 110e and 110f of the bolt 50 of the illustrated embodiment have tapering faces 130e&f, 132e&f extending from its respective side face 122e or 122f; 124e or 124f to its respective forward face 114e or 114f. Although the tapering side faces 130e&f may have other dimensional characteristics without departing from the scope of the present invention, in one embodiment the faces are tapered at an angle in a range of about 2° to about 10.5° measured from longitudinal, and more particularly at an angle of about 6.25°. Although the tapering side faces 132e&f may have other dimensional characteristics without departing from the scope of the present invention, in one embodiment the faces are tapered at an angle in a range of about 2° to about 10.5° measured from longitudinal, and more particularly at an angle of about 6.25°. In some embodiments such as the illustrated embodiment, the angles of the tapering side faces 130e&f are equal to but opposite from the tapering side faces 132e&f. Although the forward faces 114e&f may have other dimensional characteristics without departing from the scope of the present invention, in one embodiment the faces are narrower than the forward faces 114a-d,g&h by a thickness in a range of about 0.010 in. to about 0.081 in., and more particularly narrower than the forward faces by a thickness of about 0.0455 in. Further, as shown in FIG. 4, each adjacent lug pair (i.e., 110a, 110b; 110b, 110c; etc.) is spaced by a slot 134a-h.

Figure 6:
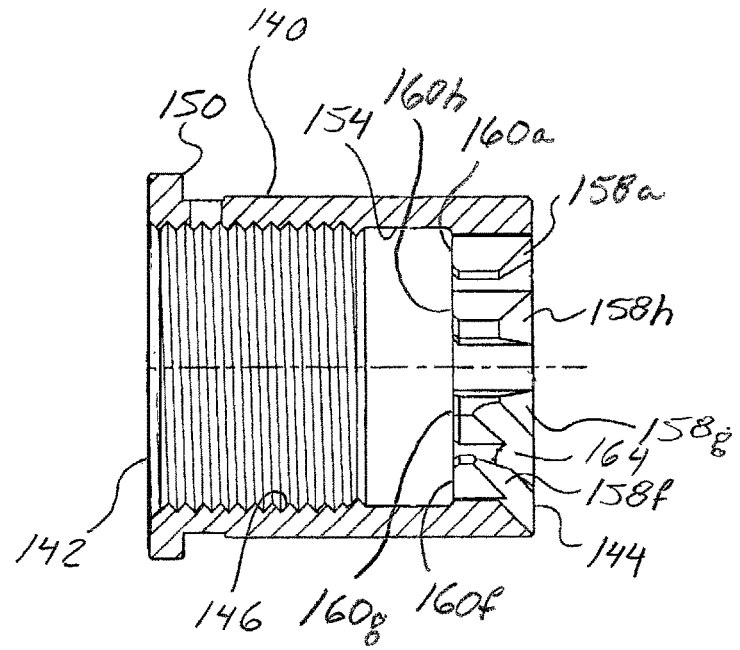
FIG. 6 is a cross section of a barrel interface of the embodiment depicted in FIG. 1.
Figure 7:
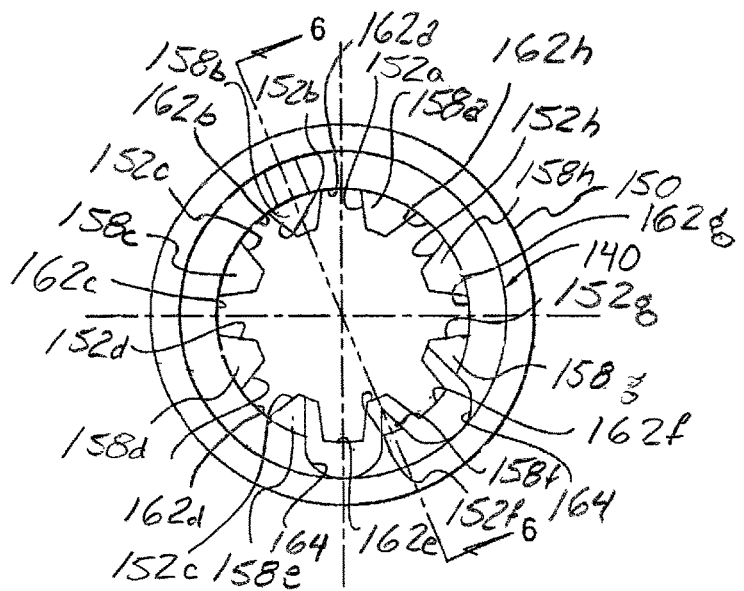
FIG. 7 is a rear elevation of the barrel interface depicted in FIG. 6.

As illustrated in FIG. 6, the receiver 30 also includes a barrel interface 140 as illustrated in FIGS. 1 and 6 that interlocks with the lug portion 90 of the breech bolt assembly 42 during firing. In some embodiments, the barrel interface 140 is configured as a barrel extension. Barrel interface 140 has forward barrel-receiving end 142 opposite a rearward bolt-receiving end 144. The barrel-receiving end 142 has an internal threaded portion 146 configured to engage threads 148 (FIG. 1) on the barrel 22 and a circumferential outer flange 150 for abutting the barrel. As shown in FIG. 7, plurality of receiver lugs 152a-h extend inward into the barrel interface 140 at the bolt-receiving end 144, and a bolt interlocking chamber 154 (FIG. 6) is provided inside the barrel interface between the receiver lugs and the internal threaded portion 146 of the barrel interface 140. Each of the receiver lugs 152a-h has a tapered rearward guide face 158a-h and an opposite radial forward load-bearing face 160a-h. In addition, each adjacent receiver lug pair (i.e., 152a, 152b; 152b, 152c; etc.) is spaced by a corresponding gap 162a-h sized and shaped for receiving corresponding bolt lugs 110a-110h. Longitudinally skewed cylindrical slots 164 extend into gaps 162e&f for guiding cartridges into the barrel interface 140 from the magazine 24 as will be appreciated by those skilled in the art.

In operation, the breech bolt assembly 42 moves back and forth along longitudinal axis L as cartridges are fired from the firearm 20 during a conventional automatic or semi-automatic sequence. U.S. Pat. No. 2,951,424 (Stoner), U.S. Pat. No. 3,198,076 (Stoner), and U.S. Pat. No. 5,351,598 (Schuetz) describe this conventional sequence in more detail. The sequence begins with the breech bolt assembly 42 in its rearward-most or open position (not shown). A cartridge is fed from the magazine 24 into the cartridge recess 92. Once a cartridge is positioned in the recess 92, the bolt 50 slides forward, positioning the cartridge in the firing chamber 26. As the bolt 50 moves forward, the bolt lugs 110a-h pass through the gaps 162a-h between the receiver lugs 152a-h of the barrel interface 140 and into the bolt interlocking chamber 154. After the bolt lugs 110a-h pass the receiver lugs 152a-h, the cam pin 82 or another conventional means rotates the breech bolt assembly 42 about the longitudinal axis L to interlock the breech in a closed position, so the rearward faces 116a-g of the bolt lugs 110a-g contact the forward load-bearing faces 160a-g of the receiver lugs 152a-g.

Once the breech bolt assembly 42 rotates into an interlocking closed position with the barrel interface 140, the cartridge in the firing chamber 26 may be fired by pulling the trigger 34. Pulling the trigger 24 causes it to pivot, releasing the hammer 36 and allowing the hammer to rotate from an engaged or cocked position to a disengaged position or firing position as shown in FIG. 1. After rotating, the hammer 36 strikes the firing pin 38, driving the pin forward in the bolt 50 to strike the cartridge in the firing chamber 26, causing it to fire. The positions of the trigger assembly 32 and the breech bolt assembly 42 just after firing are illustrated in FIG. 1.

After a cartridge is fired, the breech bolt assembly 42 rotates to disengage the bolt lugs 110a-h from the receiver lugs 152a-h and slides backward, extracting the spent shell casing before a new cartridge is loaded into the loading chamber 26 from the magazine 24. This process of sequentially loading, firing, and extracting continues through a number of cycles as determined by the shooter.

When the cartridge fires in the firing chamber 26, it transmits a recoil force on the bolt 50 in the direction indicated by arrow R. As a consequence of the recoil force, bolt lugs 110a-g are forced backward against the corresponding receiver lugs 152a-g, forming load bearing relationships between bearing faces 116a-g, 158a-g of the bolt 50 and barrel 140. As will be appreciated by those skilled in the art, the rounded tapered outer faces 120a-d&g and the tapering side faces 130e&f, 132e&f of the bolt lugs 110e&f prevent jamming without affecting the surface area of the bearing faces formed between the bolt lugs 110a-g and receiver lugs 152a-g. Thus, the bearing loads on the bolt lugs 110a-g and receiver lugs 152a-g are unchanged from conventional designs.

When the bolt 50 slides forward, the bolt lugs 110a-h can be out of alignment with the gaps 162a-h between the receiver lugs 152a-h. If a conventional bolt is used, this misalignment can prevent the bolt lugs 110a-h from passing through the receiver gaps 162a-h, preventing the bolt from reaching to its interlocking closed position and preventing the cartridge from being fully loaded in the firing chamber 26. Being unable to fire, the bolt 50 will not be forced backward to its open position, and the firearm may require servicing before it can be fired.

The rounded tapered outer faces 120a-d&g prevent the bolt lugs 110a-h from being out of alignment with the gaps 162a-h between the receiver lugs 152a-h. The rounded aspect of these faces 120a-d&g tends to guide the bolt lugs 110a-h circumferentially so the bolt lugs and receiver gaps 162a-h are circumferentially aligned. Further, the tapered aspect of the faces 120a-d&g tends to radially center the bolt lugs 110a-h in the receiver gaps 162a-h. Thus, the rounded tapered outer faces 120a-d&g properly align the bolt lugs 110a-h with the gaps 162a-h and prevent jamming due to misalignment.

The tapering side faces 130e&f, 132e&f prevent the bolt lugs 110e&f from circumferentially interfering with the corresponding receiver lugs 152e-g, even when the bolt lugs 110a-h are circumferentially misaligned with the receiver gaps 162a-h. Further, the forward faces 114e&f of the bolt lugs 110e&f are of conventional height so the bolt lugs can push cartridges along the longitudinally skewed slots 164 in the barrel interface 140 to fully seat in the firing chamber 26. Further, as will be appreciated by those skilled in the art, the skewed slots 164 in the barrel interface 140 tend to circumferentially and radially center the bolt lugs 110e&f as the bolt 150 is driven forward.

Preferably, components of the breech bolt assembly 42 and the barrel interface 140 are manufactured from a metal suitable for use in firearms using techniques known to those skilled in the art. Furthermore, it is preferred that the bolt 50 and barrel interface 140 each be formed from a single, unitary piece of material; however, in alternative embodiments, the bolt and the barrel interface may each be made by coupling two or more separate components as would occur to one skilled in the art. Also, it is contemplated that the bolt assembly 42, the bolt 50, and the barrel interface 140 may be formed from different materials suitable for their intended purpose.

As used herein, the term firearm is intended to include rifles, shotguns, pistols, and other portable guns. Further, the term firearm is not intended to be limited to center-fire weapons as described above.

All publications and patent applications cited in this specification are herein incorporated by reference as if each individual publication or patent application were specifically and individually indicated to be incorporated by reference.

Having described the invention in detail, it will be apparent that modifications and variations are possible without departing from the scope of the invention defined in the appended claims. Although specific language is used to describe features of the illustrated embodiment, it should be understood that no limitation of the scope of the invention is thereby intended. Any alterations and further modifications in the described device, and any further applications of the principles of the invention as described herein are contemplated as would normally occur to one skilled in the art(s) to which the invention relates.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A breech bolt assembly for mounting in a firearm for loading a cartridge in a firing chamber of the firearm prior to firing a projectile from the cartridge and extracting a shell casing from the firing chamber after firing, the bolt assembly comprising:

a bolt including an elongate cylindrical body portion having a longitudinal centerline, a lug portion extending forward from the body portion, and a firing pin bore extending through the bolt substantially parallel to the longitudinal centerline, said lug portion including a plurality of spaced lugs extending outward therefrom, at least three of said spaced lugs being of substantially equal height and equally spaced, a cartridge recess at a front end sized and shaped for holding a rearward end of the cartridge therein, an extractor cavity extending rearward from the cartridge recess, and an off-center longitudinal hole at least partially aligned with the cartridge recess;

an extractor pivotally mounted in the extractor cavity and biased to hold the cartridge in the cartridge recess; and an ejector pin slidably received in the off-center longitudinal hole, the pin being biased to eject the shell casing from the cartridge recess;

wherein at least two of the plurality of lugs on the lug portion of the bolt have:

a flat top surface portion extending from a rearward face of the respective lugs, the rearward face having a quadrilateral shaped perimeter with a curved bottom edge, an arc of the curve extending toward a top edge of the rearward face, the flat top surface portion having an arcuate leading edge; and a rounded tapering outer face extending from the arcuate leading edge of the flat top surface portion along more than 25% of a longitudinal length of the respective lug to a forward face of the respective lug, the forward face having a rounded top edge, the rearward face of the respective lug being taller than the forward face of the respective lug; and wherein the rounded tapering outer face of each respective lug has an outer radius that is less than a radial distance between said centerline and the corresponding outer face.

2. The breech bolt assembly as set forth in claim 1, wherein each of the tapering outer faces is tapered at an angle in a range of about 10° to about 32° measured from longitudinal.

3. The breech bolt assembly as set forth in claim 2, wherein the angle at which each of the tapering outer faces tapers is about 21° measured from longitudinal.

4. The breech bolt assembly as set forth in claim 1, wherein the forward face of each lug having the tapering outer face is shorter than the corresponding rearward face by a radial distance in a range of about 0.025 inches to about 0.045 inches.

5. The breech bolt assembly as set forth in claim 4, wherein the radial distance by which the forward face is shorter than the rearward face is about 0.035 inches.

6. The breech bolt assembly as set forth in claim 1, wherein at least one of the plurality of lugs on the lug portion of the bolt without a tapering outer face have tapering side faces so that the rearward face of the respective lug is wider than the forward face of the respective lug.

7. The breech bolt assembly as set forth in claim 6, wherein each of the tapering side faces tapers at an angle in a range of about 2° to about 10.25° measured from longitudinal.

8. The breech bolt assembly as set forth in claim 7, wherein the angle at which each of the tapering side faces tapers is about 6.25° measured from longitudinal.

9. The breech bolt assembly as set forth in claim 6, the forward face is narrower than the rearward face by a distance in a range of about 0.010 inches to about 0.081 inches.

10. The breech bolt assembly as set forth in claim 9, the distance by which the forward face is narrower than the rearward face is about 0.0455 inches.

* * * * *